United States Patent
Voit (10) Patent No.: US 9,705,921 B2
(45) Date of Patent: Jul. 11, 2017

(54) AUTOMATED SYNCHRONIZED DOMAIN WIDE TRANSIENT POLICY

(71) Applicant: Cisco Technology, Inc., San Jose, CA (US)

(72) Inventor: Eric A. Voit, Bethesda, MD (US)

(73) Assignee: Cisco Technology, Inc., San Jose, CA (US)

( * ) Notice: Subject to any disclaimer, the term of this patent is extended or adjusted under 35 U.S.C. 154(b) by 102 days.

(21) Appl. No.: 14/254,492

(22) Filed: Apr. 16, 2014

(65) Prior Publication Data

US 2015/0304355 A1  Oct. 22, 2015

(51) Int. Cl.
H04L 29/06 (2006.01)

(52) U.S. Cl.
CPC .................................... *H04L 63/20* (2013.01)

(58) Field of Classification Search
CPC .. H04L 63/20; H04L 63/1416; H04L 63/1458
See application file for complete search history.

(56) References Cited

U.S. PATENT DOCUMENTS

| | | | | |
|---|---|---|---|---|
| 7,565,696 B1 * | 7/2009 | Njemanze | ............... | H04L 63/20 709/224 |
| 7,607,164 B2 * | 10/2009 | Vasishth | ............... | G06F 21/577 709/223 |
| 7,751,405 B1 * | 7/2010 | Kompella | ........... | H04L 12/4633 370/254 |
| 8,042,178 B1 * | 10/2011 | Fisher | ................... | G06F 21/554 726/22 |
| 8,561,175 B2 | 10/2013 | Williams et al. | | |
| 9,313,211 B1 * | 4/2016 | Lototskiy | ............. | H04L 63/107 |
| 2004/0039594 A1 | 2/2004 | Narasimhan et al. | | |
| 2006/0036727 A1 * | 2/2006 | Kurapati | ............. | H04L 63/1458 709/224 |
| 2006/0067231 A1 * | 3/2006 | Ikoma | ..................... | H04L 49/90 370/235 |
| 2006/0089938 A1 | 4/2006 | Leonard et al. | | |
| 2006/0206935 A1 | 9/2006 | Choi et al. | | |
| 2006/0242701 A1 | 10/2006 | Black et al. | | |
| 2007/0064604 A1 | 3/2007 | Chen et al. | | |
| 2008/0013533 A1 | 1/2008 | Bogineni et al. | | |
| 2008/0148347 A1 | 6/2008 | Bocq et al. | | |

(Continued)

*Primary Examiner* — Harunur Rashid
*Assistant Examiner* — Cheng-Feng Huang
(74) *Attorney, Agent, or Firm* — Edell, Shapiro & Finnan, LLC (57) ABSTRACT

Techniques are provided for, at an administrative device in a network domain, monitoring a network traffic flow parameter to determine whether a presently applied domain wide policy configured to control a network traffic flow should be removed. In response to determining that the domain wide policy should be removed, a command is generated which causes removal of the domain wide policy at each one of the plurality of network devices, and the command is sent to each one of the plurality of network devices to cause the domain wide policy to be removed at substantially the same time at each network device. Alternatively, the domain wide policy can be automatically removed by the expiry of a timer or in accordance with a timestamp so that the policy is revoked across the network domain without a need for an explicit network wide control message instructing removal of the policy.

10 Claims, 10 Drawing Sheets

(56) References Cited

U.S. PATENT DOCUMENTS

| | | |
|---|---|---|
| 2010/0064341 A1* | 3/2010 | Aldera .................. H04L 63/102 |
| | | 726/1 |
| 2010/0218235 A1* | 8/2010 | Ganot .................. H04L 41/0813 |
| | | 726/1 |
| 2011/0264798 A1 | 10/2011 | Joshi |
| 2012/0117235 A1 | 5/2012 | Castro Castro et al. |
| 2012/0213114 A1 | 8/2012 | Chen et al. |
| 2013/0311667 A1 | 11/2013 | Payette |
| 2013/0322257 A1 | 12/2013 | Shimonishi et al. |
| 2014/0123209 A1* | 5/2014 | Rajakarunanayake H04W 12/08 |
| | | 726/1 |
| 2015/0049604 A1* | 2/2015 | Keith .................. H04L 47/2441 |
| | | 370/230 |

* cited by examiner

AUTOMATED SYNCHRONIZED DOMAIN WIDE TRANSIENT POLICY

TECHNICAL FIELD

The present disclosure relates to automated management of domain wide policies, and in particular, to removing domain wide policies from each network device of a plurality of network devices in an automated synchronized manner.

BACKGROUND

Network attacks can take on a variety of forms, including distributed denial of service (DDoS) attacks, in which two or more entities attempt to cause abnormal termination or behavior of network applications and/or services to users, e.g., by flooding a network with traffic and/or sending invalid data to applications or network services until a shutdown occurs due to network overload. Typically, policies are established and implemented during an attack to counteract undesirable effects. Once the attack is over, such policies typically remain in effect, unless manually removed, thereby filling up, e.g., routers, with obsolete policies and making router management difficult.

DESCRIPTION OF EXAMPLE EMBODIMENTS

Overview

In accordance with one aspect, techniques are provided for, at an administrative (or controller) device in a network domain comprising a plurality of network devices, monitoring a network traffic flow parameter to determine whether a presently applied domain wide policy configured to control a network traffic flow should be removed. In response to determining that the domain wide policy should be removed, a command is generated which causes removal of the domain wide policy at each one of the plurality of network devices, and the command is sent to each one of the plurality of network devices to cause the domain wide policy to be removed from each one of the plurality of network devices at substantially the same time.

In accordance with another aspect, techniques are also provided for, at a plurality of network devices in a network domain, receiving a domain wide policy configured to control a flow of network traffic through each of the plurality of network devices, and implementing the domain wide policy. In accordance with one or more parameters specifying that the domain wide policy is to be removed, the policy is removed from each one of the network devices in the plurality of network devices at substantially the same time.

Example Embodiments

Network attacks can take on a variety of forms, including distributed denial of service (DDoS) attacks, in which two or more entities attempt to cause abnormal termination or behavior of network applications and/or services to users, e.g., by flooding a network with traffic and/or sending invalid data to applications or network services until a shutdown occurs due to network overload. In response, policies may be implemented to neutralize the attack, and typically remain active on one or more network devices after the attack has ceased.

While various approaches exist today for countering DDoS attacks, such approaches have limitations. For example, Network Management Systems (NMSs) based provisioning systems may be used to manage and provision a set of router based Access Control Lists (ACLs), but managing such lists requires manual configuration and removal of policies. In addition, awareness of the attack needs to be coordinated with external systems, which usually increases the time needed to address and respond to a threat. Additionally, for security devices such as firewalls, policies may clear certain traffic flows of malicious activity, such that these flows no longer need to pass through a DDoS traffic scrubber, which detects and removes threats and attacks at various network protocol layers. However, managing such policies typically requires external and possibly manual reconfiguration of the firewall in order to redirect traffic flows. Still another example involves Software Defined Networking (SDN) based policy configuration protocols. However, in this case, it is possible that reconfiguration messages can be lost due to router reboots or lost messages, making it difficult to maintain consistency over the long term.

Accumulation of such policies on network devices over time not only consumes memory on the network device, but also makes management and troubleshooting of the network device challenging, as identifying and removing legacy policies may involve difficult and time consuming manual processes.

Embodiments described herein encompass generating and removing "transient" domain wide network policies automatically, based on changing network conditions. Transient polices are policies which are active/enabled during the life of an attack, and once the attack has ended, are removed (or timed-out) at each one of the network devices at which it was installed. For example, policies may encompass filters, implemented as part of an Access Control List (ACL), which generally refer to rules applied to port numbers and/or Internet Protocol (IP) addresses to determine which hosts and/or networks are permitted access to a device and/or service. Rules may be established and implemented during a DDoS attack to block access to a specific host/network, but may not be needed once an attack has ceased.

Accordingly, the techniques presented herein provide for removing policies that are no longer needed, thereby reducing the number of obsolete policies stored on network devices, e.g., routers, switches, edge switches, etc. Policies are removed concurrently across all the network devices within entire the network domain, at substantially the same time, and in some embodiments, without requiring additional interaction with an application control plane or maintaining an external application state. Automatic removal of transient policies may occur by a variety of mechanisms, including: (a) a controller sending a message to a plurality of network devices, (b) a controller providing an indication that the policy should be removed, (c) a timer expiring on a plurality of network devices, or (d) any equivalent thereof. In these cases, policies are removed at substantially the same time across each one of the network devices of the plurality of network devices. Additionally, should there be reason to reinstate the removed policy due to a subsequent attack, such policy may be reinstated, across each network device of the plurality of network devices, within the entire network domain. The foregoing is described more fully below in conjunction with FIGS. 1-9.

Figure 1:
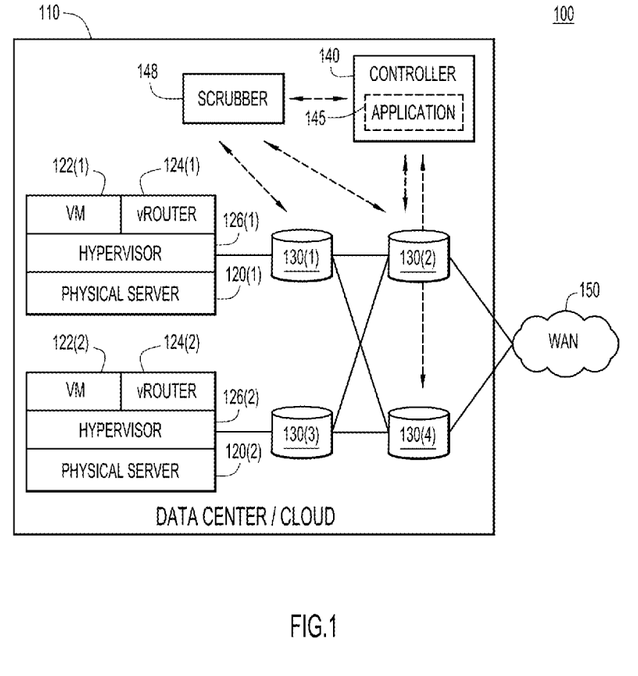
FIG. 1 is a block diagram of an example network topology, including a controller that manages, removes, and implements transient policies for a plurality of network devices, according to an example embodiment.

FIG. 1 is a block diagram of an example network topology 100 capable of generating, implementing, managing, and removing transient policies across a network domain, according to the techniques described herein. System 100 may comprise a local area network (LAN) 110 as well as a wide area network (WAN) 150. LAN 110 may further comprise a plurality of physical servers 120(1) and 120(2), which host a plurality of virtual machines (VMs) 122(1) and 122(2), virtual routers (vRouters) 124(1) and 124(2) as well as hypervisors 126(1) and 126(2). Additionally, a series of network devices 130(1)-130(4) are shown, which each communicate with a controller 140. In other embodiments, the techniques disclosed herein may be applied to network devices in a data center/cloud computing environment. It is understood that the techniques disclosed herein may be applied to a virtually unlimited number of network devices, and are not limited by the specific examples presented herein.

In some embodiments, network devices 130(1)-130(4) may comprise one or more edge switches/routers. Edge switches are network devices typically located at a meeting point between networks, e.g., between a LAN and an Internet Service Provider (ISP) WAN or between VMs and a LAN. Edge switches may also contain traffic counters (e.g., at ingress and/or egress points of the edge switch device), and may collect information regarding traffic flow volumes/amounts over a period of time. Examples of edge switches include, e.g., WAN facing edge devices 130(2) and 130(4). Present invention embodiments are not limited to being implemented in edge switches/routers, and may apply to any suitable network device.

Hypervisors, also referred to as virtual machine managers, are generally software programs that allow the selection of alternative operating systems which can run on (and possibly share) a single hardware host or physical server. Virtual routers provide software-based routing frameworks that allow physical servers to act as hardware-based routers, e.g., in a LAN. In cloud-based environments, virtual routing and forwarding (VRF) technology may provide for multiple instances of routing tables to exist on a physical server, thereby permitting network paths to be segmented per customer.

Controller 140 may generate, implement, and maintain instructions or indications regarding whether a particular domain wide policy should be maintained. Controller 140 may also comprise an application 145 for monitoring and analyzing network traffic. In some embodiments, application 145 may be integrated with the controller, while in other embodiments, application 145 may be implemented in a separate device that is in communication with controller 140.

In operation, traffic flows may be monitored at each of the network devices 130(1)-130(4) (or a subset of network devices) and the results communicated to application 145. For example, traffic counters configured at ingress and/or egress interfaces of network devices may monitor destination subnet bandwidth and/or traffic flow volumes, and send this information to application 145. Application 145 may analyze this information to determine whether an abnormality in traffic flow has occurred, e.g., summing results across a plurality of network devices to determine if a spike in network traffic has occurred. Other triggers may work as well, including monitoring VM Central Processing Units (CPUs) for spikes in CPU usage, or deletion of Quality of Service (QoS) marked-down traffic from ingress policer. Regarding marked down traffic, an upstream policer may remark Differentiated Services Code Point (DSCP) bits in a traffic header, indicating that a target rate has been exceeded. Once traffic has been marked down (e.g., placed into a lower priority traffic class), traffic may be treated differently by the network. Thus, application 145 may identify a suspect spike in traffic volume/amount in a particular subnet, communicate this information to controller 140, and in response, controller 140 may set a policy at network devices 130(1)-130(4) or any subset thereof, which may send suspect network traffic to a DDoS scrubber for inspection. For example, traffic spikes egressing an edge switch into a VM, may be redirected such that all flows to that VM are service chained.

Once implemented, policies may be further refined, e.g., based on information provided by a DDoS scrubber 148 that determines which traffic flows of the total number of suspect traffic flows are considered to be safe. As shown in FIG. 1, traffic may be routed from any network device to scrubber 148 for inspection. The scrubber inspects one or more packets from a traffic flow to determine whether the traffic flow is considered to be safe, to be dangerous, and/or whether a DDoS attack fingerprint has been perceived. The scrubber 148 may then communicate this information to controller 140, and in response, controller 140 may remove/modify an initially established general subnet policy on e.g., ingress routers, refining the policy such that only suspect/malicious flows are sent into the service chain to be scrubbed. If traffic hits a specified threshold rate subsequent to refining a policy, the general policy may be reinstated, and refined again, as needed.

Policies may be removed when a specified amount of time has been exceeded, when an attack has ended (e.g., the operator may configure removal of policies manually), when traffic, e.g., ingress traffic to the service chain, falls below a specified threshold, or when there are other higher priority uses for off-box or service chain resources. Each domain wide policy is removed at network devices 130(1)-130(4) (or any subset to which the policy was deployed) at substantially the same time, but may be removed or retained (in an inactive form) at controller 140. Should the policy need to be reinstated at a future point in time, due to a subsequent attack, the retained policy may be retrieved and reinstated, according to the techniques described herein.

In additional embodiments, controller 140 or application 145 may communicate with other traffic monitoring devices, such as firewalls, capable of determining whether a threat is ongoing. This information may also be used to determine whether a domain wide policy should remain in effect.

Embodiments also encompass Software Defined Networks (SDNs), which are able to learn network topology. For example, controller 140 may have the capability to detect new components added to network 110, e.g., new physical servers, network devices, etc., and push domain wide policies to these new components, bringing these new components into accordance with implemented policies on peer devices.

In some embodiments, managing the creation and removal of policies may be performed using a Hierarchical Network Registry (HNR). HNR allows mounting of remote directories to make them accessible to local applications. HNR may be used to apply configuration settings at a network or domain level such that all devices read from a single, remote, authoritative source of data object/value integrity. Removing policies in HNR may be implemented by deleting the network wide policy, and allowing traffic to flow to each network device. HRN may also be used to assess how long it takes to automatically push and revoke policies that are undergoing distribution in a network. Response times are generally around one second or below.

Figure 2A:
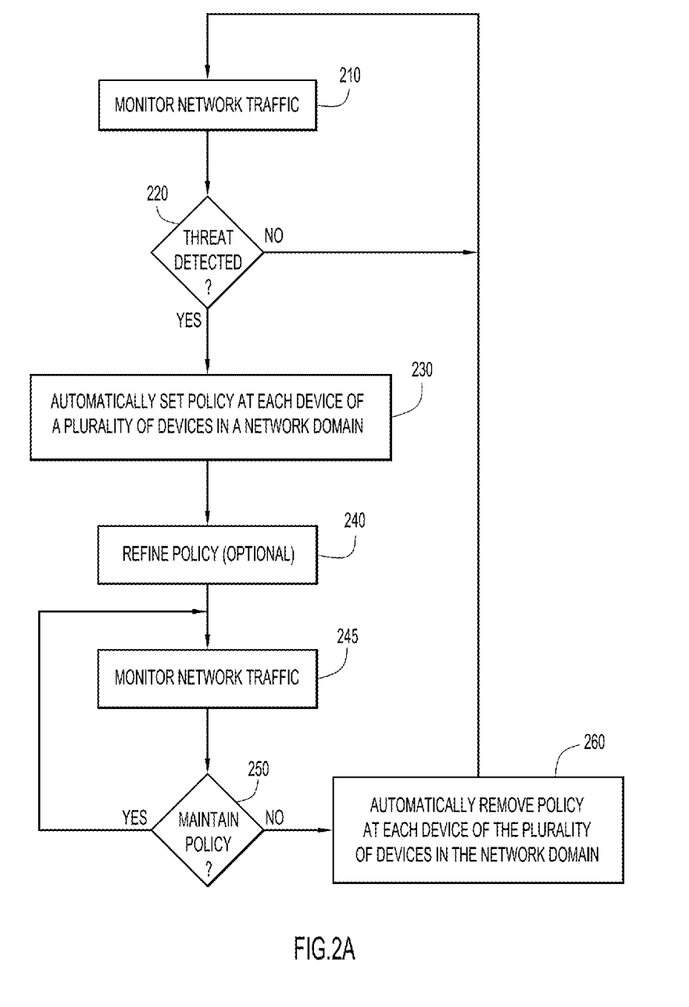
FIG. 2A is a flow chart depicting controller logic for implementing, managing, and removing policies for a plurality of network devices, according to an example embodiment.

Referring to FIG. 2A, controller 140 logic is shown, which manages, removes, and implements domain wide network policies. At operation 210, network traffic is monitored. Controller 140 may receive information from any of network devices 130(1)-130(4) (or any subset thereof) regarding various characteristics of network traffic flow, which may be analyzed by application 145. At operation 220, controller 140 determines if a threat has been detected based upon traffic monitoring. If no threat has been detected, the system continues to monitor network traffic at operation 210. Otherwise, controller 140 automatically sets a policy at each network device of a plurality of network devices in a network domain (e.g., a domain wide network policy) at operation 230. In some embodiments, network traffic associated with a threat may be directed towards a DDoS scrubber, as described herein. Operation 240, which is optional, may involve refinement of the policy invoked at operation 230. For example, based on the results of processing by the DDoS scrubber, some traffic flows may be determined to be safe, and therefore, the policy may be refined to exclude these traffic flows from being service chained and sent to a scrubber. At operation 245, network traffic continues to be monitored. Based on the results of this monitoring, controller 140 may determine, at operation 250, whether the policy invoked at operation 230 (or refined at operation 245) should be maintained. If the policy is to be maintained, controller 140 (in conjunction with application 145) continues to monitor network traffic at operation 245, collecting information to determine at a subsequent point in time as to whether the policy should be maintained. Alternatively, if the policy does not need to be maintained, at operation 260, the policy is automatically removed at each device of plurality of network devices in the network domain at substantially the same time, and monitoring continues at operation 210. Briefly, removal of the policy at each device may occur, e.g., by a command sent to each network device 130(1)-130(4) (or any subset thereof) or by a change in a policy indicator at controller 140. In some embodiments, policies may be applied to a subset of network devices, e.g., WAN facing edge devices 130(2) and 130(4), and may also be removed according to the techniques disclosed herein. Further details are provided herein.

It should be noted that new threats may be detected concurrently with the operations being performed with respect to the current threat. Thus, for each new threat detected, the operations in FIG. 2A may be performed concurrently with the operations being performed in response to the current threat.

Figure 2B:
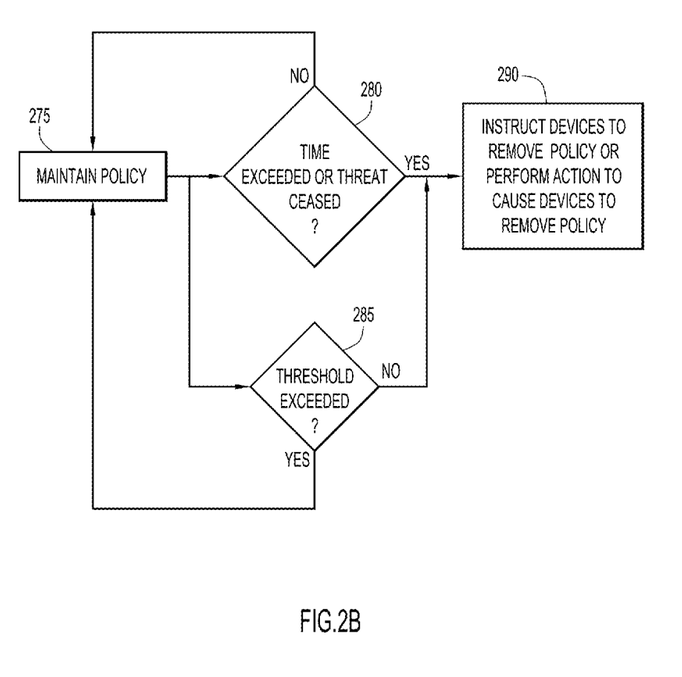
FIG. 2B is a flow chart, depicting in additional detail, controller logic for determining whether a policy according to FIG. 2A should be maintained, according to an example embodiment.

FIG. 2B is another flow chart illustrating operation 250 of FIG. 2A, in further detail. This flow chart depicts logic at controller 140, for determining whether a given network wide domain policy should be maintained. At operation 275, a policy is currently being maintained. At operation 280, controller 140 determines whether a specified time window has been exceeded or if a threat/attack has ceased, and if so, the policy is removed from the network devices at operation 290. Otherwise, the policy continues to be maintained at operation 275. At operation 285, controller 140 may determine if an amount of network traffic exceeds a predetermined threshold, and if so, a threat is generally perceived as ongoing. Therefore, the policy will be maintained at operation 275. Otherwise, the domain wide policy may be removed at operation 290. Operations 280 and 285 may repeat on a periodic basis. Accordingly, when the specified period of time has been exceeded, the threat has ceased, or when traffic falls below a threshold, the domain wide policy is automatically revoked throughout the network domain.

Figure 3:
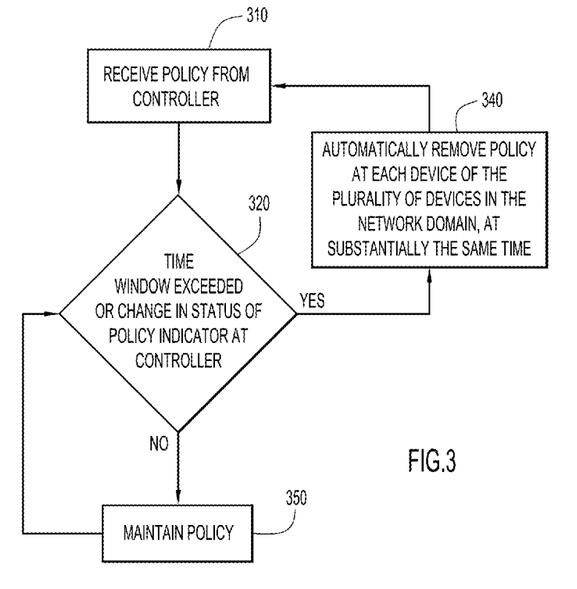
FIG. 3 is a flow chart depicting device logic for determining whether a policy should be maintained or removed at a given device, according to an example embodiment.

Referring to FIG. 3, a flow chart is shown depicting logic for implementing domain wide policies and determining whether domain wide policies are to remain in effect at each device of a plurality of network devices in the network domain. At operation 310, a domain wide policy is received and implemented at each device of a plurality of network devices of the network domain. At operation 320, each network device determines whether the policy should still be in effect, e.g., by determining whether a corresponding window of time that the policy is to remain in effect has been exceeded, or by evaluating the status of a policy indicator stored at controller 140, the policy indicator corresponding to the particular policy being evaluated. If the time window has been exceeded or a change in status of a policy indicator has occurred (indicating that the policy is to be removed), at operation 340, the network wide policy is removed at each device of the plurality of devices in the network domain at substantially the same time. Otherwise, the policy is maintained, as shown at operation 350, and the device continues to periodically evaluate whether the policy should remain in effect, at operation 320.

As previously indicated, removal of domain wide policies occur at substantially the same time for each device of a plurality of devices in the domain. If a window of time is used to determine how long a policy should be in effect, each device may be synchronized to a domain clock, such that when the specified period of time has been exceeded, the policy is globally removed by each device at substantially the same time. If attacks or other malicious activities resume, policies may be automatically reinstalled by controller 140, e.g., by associating the policy with a new time window, again synchronized to a domain clock. In other embodiments, in which devices are polling the status of an indicator stored at controller 140, such events may also be configured to occur at specific time intervals based on a domain clock, to ensure that a policy is removed across devices at substantially the same time. In other embodiments, network devices may receive commands from controller 140 to monitor indicator status.

In other embodiments, in which a threat is likely to be persistent, a policy may be left in place at the plurality of network devices, but in an idle state, such that upon reengagement of the threat, the policy may reengage. For example, a specific policy may reside in a network element, and may be reengaged (applied) to an interface upon request. Thus, engagement of the policy behaves essentially as an on/off switch.

It should be noted that additional network policies may be evaluated concurrently with respect to the operations being performed with respect to evaluation of the current policy. Thus, for each policy evaluated, the operations in FIG. 3 may run concurrently with one or more other policy evaluations.

Figure 4:
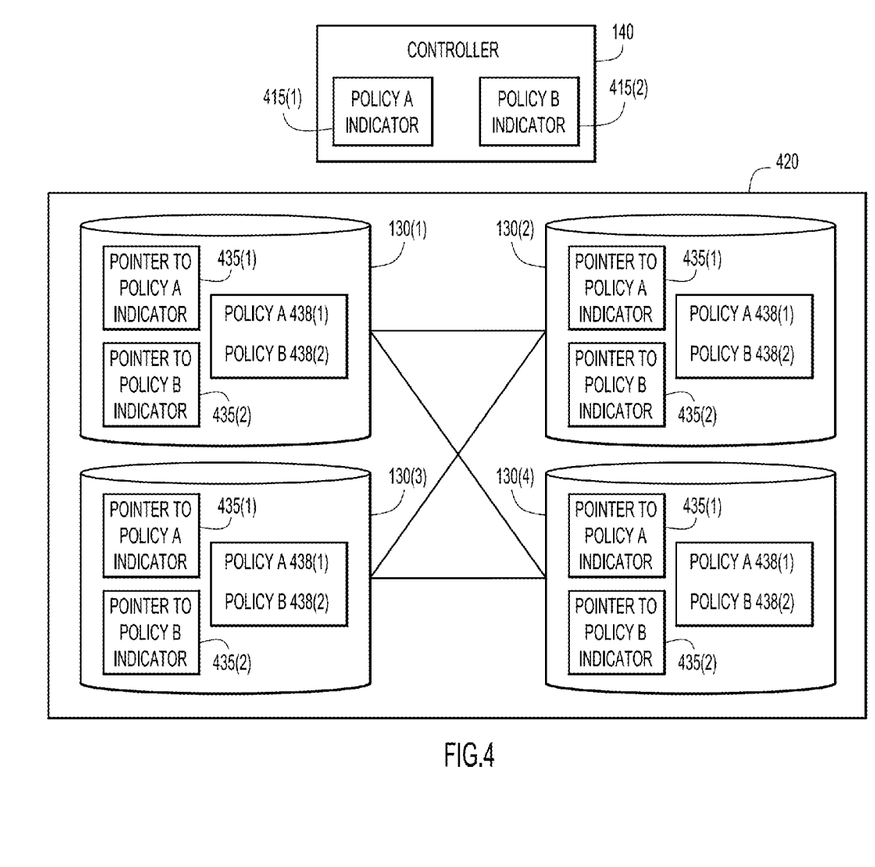
FIG. 4 is a block diagram showing management of policies at network devices by referencing a policy indicator stored on a controller, according to an example embodiment.

FIG. 4 shows a block diagram, in which automated revocation of a domain wide network policy at each device of a plurality of network devices in a network may be triggered by a status change of an indicator to a policy stored at a central location, e.g., at controller 140. Pointers within distributed network devices may reference/subscribe to a central policy location, e.g., controller 140. Automated revocation of the policy at the central point triggers revocation to the network devices which have subscribed.

As an example, controller 140 shows two examples of an indicator to a policy, e.g., a Policy A indicator 415(1) and a Policy B indicator 415(2). Each network device 130(1)-130(4) in network domain 420 has both a pointer 435(1) to the Policy A indicator 415(1) as well as the corresponding Policy A itself 438(1) and a pointer 435(2) to the Policy B indicator 415(2) as well as the corresponding Policy B itself 438(2). Removal of policy A at network devices 130(1)-130(4) may be triggered by revoking policy A at controller 140, as indicated by the Policy A indicator 415(1). By periodically monitoring the status of the indicator, to determine if any changes have occurred (i.e. the policy is to be revoked), domain wide policies can be removed at a plurality of network devices at substantially the same time. Monitoring of an indicator status may be triggered based upon a domain clock (e.g., a timer) or from commands from controller 140.

In this embodiment, continual maintenance on whether the policy, e.g., Policy A or Policy B, should remain active across the network domain is performed by evaluating, at controller 140 and/or application 145, information provided by distributed network device based counters as part of devices 130(1)-130(4), e.g., summing results across the full domain to determine policy per node information flows from each network device (on a periodic basis). The instant embodiments are not limited to information provided by network devices 130(1)-130(4), but such information may also be supplied by any other device capable of detecting network threats and/or attacks.

The techniques disclosed in FIG. 4 may also be applied to a subset of network devices, e.g., WAN facing network devices 130(2) and 130(4).

Figure 5:
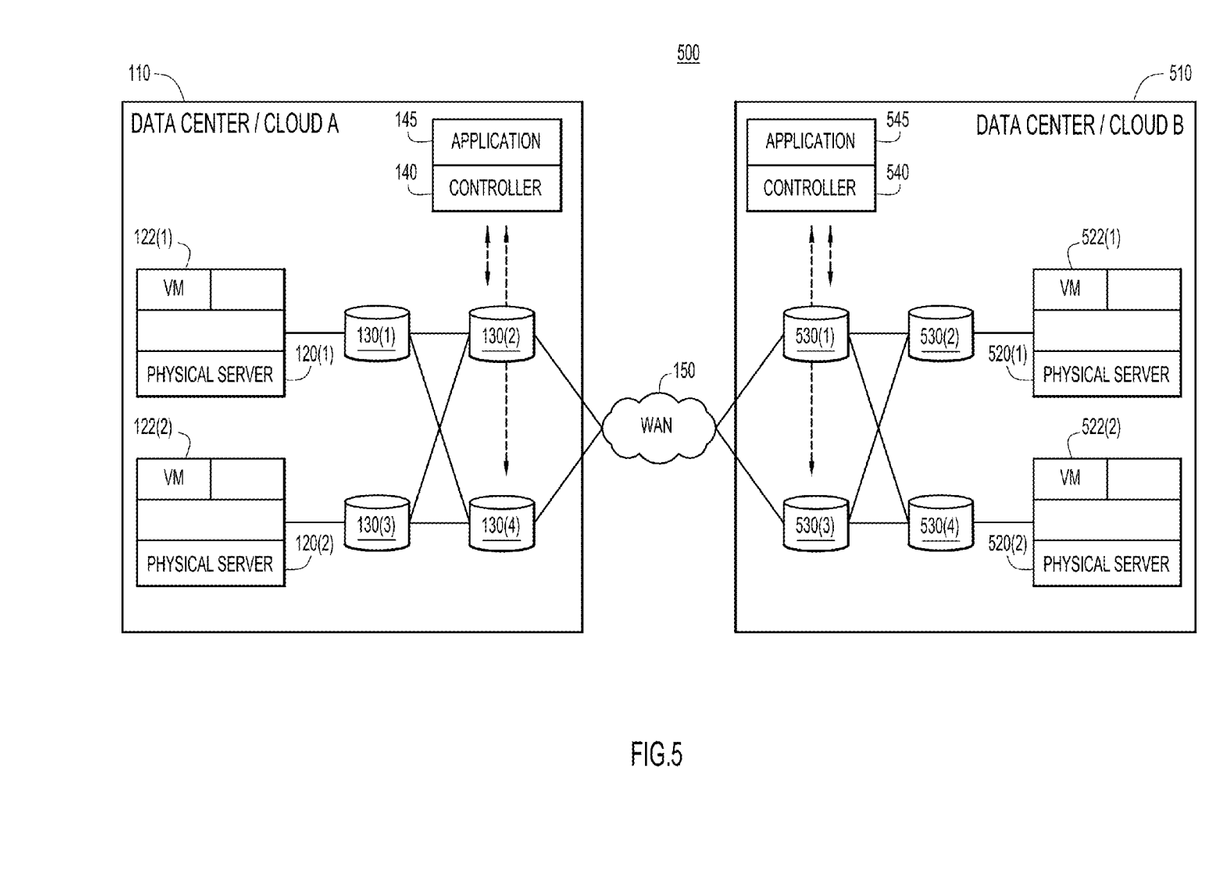
FIG. 5 is a block diagram, similar to FIG. 1, but showing management of network policies in multiple local area network domains, by sending policies from a primary controller to peer controllers, each peer controller controlling another local area network domain, according to an example embodiment.

FIG. 5 is a block diagram, similar to FIG. 1, of an example network topology 500 capable of generating, implementing, managing, and removing transient policies across multiple network domains. In the depicted arrangement, a primary controller may send instructions to peer controllers, each peer controller controlling another local area network domain, to implement policies across multiple network domains. In other embodiments, the techniques disclosed herein may be applied to network devices in a data center/cloud computing environment.

Physical servers 120(1) and 120(2), VMs 122(1) and 122(2), network devices 130(1)-130(4), LAN 110, controller 140 and application 145 were all previously described in conjunction with FIG. 1, and will not be repeated here. Although not shown in FIG. 5, vRouters and hypervisors are understood to be present, functioning in a manner similar to FIG. 1.

Local area network (LAN) 510 is connected to WAN 150. LAN 510 comprises a plurality of physical servers 520(1) and 520(2), which host a plurality of VMs 522(1) and 522(2) along with vRouters and hypervisors (not shown). A series of network devices 530(1)-530(4) each communicate with controller 540 and/or application 545. LAN 510 and its components are analogous to LAN 110 and its components, as described previously in conjunction with FIG. 1.

In this example, a policy generated at controller 140 in LAN 110, may be sent to peer controller 540 for distribution and implementation on a second network domain comprising network devices 530(1)-540(4) or any subset thereof. In some embodiments, policies are implemented at substantially the same time across network domains. In other embodiments, policies are implemented at a first network domain, and subsequently implemented on a second network domain, with implementation on the second network domain limited by transmission time between controller 140 and controller 540.

Policies may be removed by instructions originating from controller 140 or instructions originating at controller 540. For example, controller 140 may send a message to controller 540, and in response, controller 540 may send a message to each device 530(1)-530(4) instructing removal of the policy. Similarly, controller 540 may send a message to each device 530(1)-530(4), independently from controller 140, indicating that a policy should be removed. In some embodiments, policies may be removed at substantially the same time across multiple network domains. Alternatively, policies may first be removed at a first network domain at substantially the same time, and subsequently, at a second network domain at substantially the same time.

In other embodiments, policies implemented on network devices 530(1)-530(4) may be removed in a manner that is independent of controller 140. For example, if the policy is set to expire based upon expiration of a period of time, each network device 530(1)-530(4) may remove the policy once the specified period of time has expired. If a policy is set to expire based upon a domain clock, then a policy at network devices 130(1)-130(4) and 530(1)-530(4) across multiple domains may be synchronized such that the policy is removed at each network device at substantially the same time. In such scenarios, instructions from controller 140 would not be needed in order to remove expired policies. In other embodiments, controller 140 may set up a policy indicator on controller 540, reflective of a policy indicator established at controller 140. Controller 540 may then periodically poll controller 140 in order to determine if a status change in the policy indicator has occurred. Network devices 530(1)-530(4) may periodically poll controller 540 to detect changes in indicator status.

It is understood that the techniques disclosed in FIG. 5 may also be applied to a subset of network devices, e.g., WAN facing network devices 530(1) and 530(3).

Figure 6:
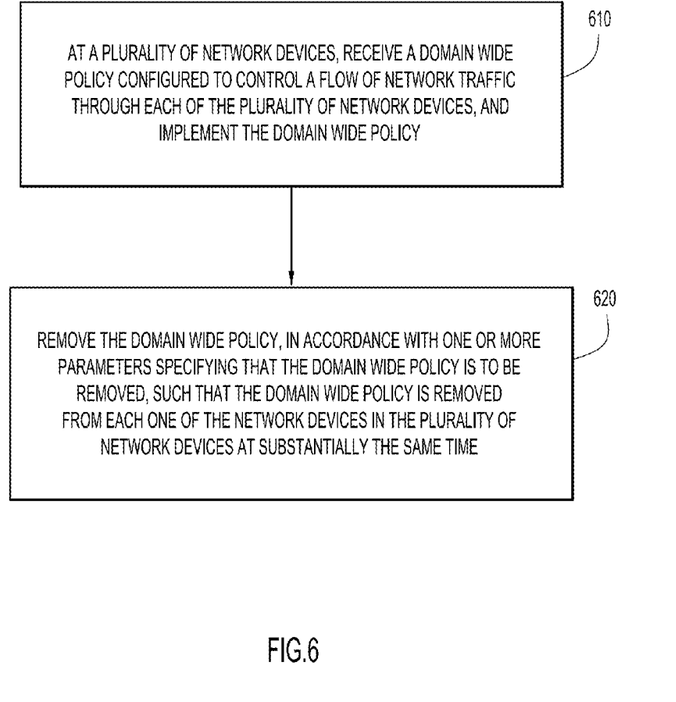
FIG. 6 is a flow chart depicting operations performed at a plurality of network devices with regard to implementing and removing network policies, according to an example embodiment.

FIG. 6 shows a flow chart describing operations according to the techniques described herein. At operation 610, at a plurality of network devices in a network domain, a domain wide policy configured to control a flow of network traffic through each of the plurality of network devices is received and implemented. At operation 620, the domain wide policy is removed in accordance with one or more parameters specifying that the domain wide policy is to be removed, such that the domain wide policy is removed from each one of the network devices in the plurality of network devices at substantially the same time.

Figure 7:
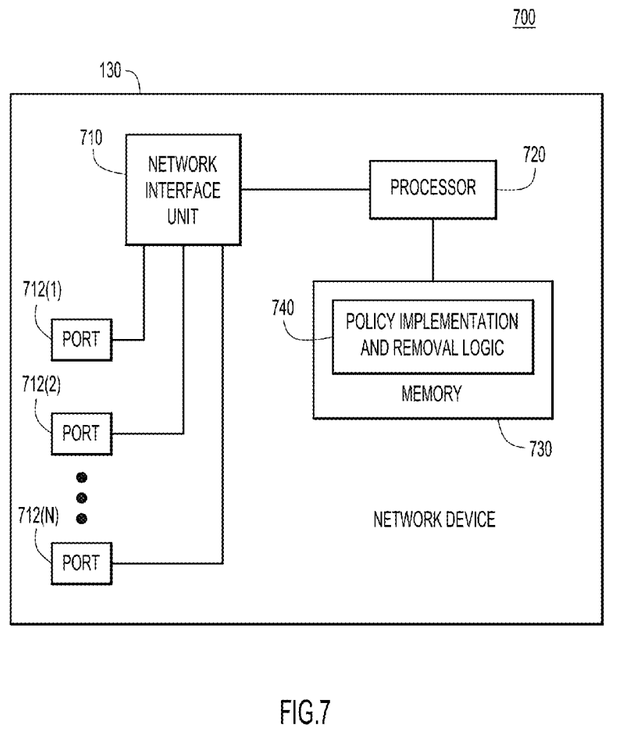
FIG. 7 is a block diagram depicting a network device having policy implementation and removal logic, according to an example embodiment.

FIG. 7 illustrates an example block diagram of an apparatus 700 (e.g., a network device 130) configured to perform the techniques presented herein. The network device 700 comprises a network interface unit 710, ports 712(1)-712(N), a processor 720, and memory 730. The network interface unit 710 is configured to enable network communications by interfacing with a network via ports 712(1)-712(N). While conceptually illustrated as a "network interface unit," it will be appreciated that a physical device may contain more than one network interface or type of interface to communicate with other devices within a network. The processor 720 is one or more microprocessors or microcontrollers and executes policy implementation and removal logic 740 associated with the techniques disclosed herein. The memory 730 stores policy implementation and removal logic 740 (configured to effectuate the operations depicted in, e.g., FIGS. 1-5).

Memory 730 may be embodied by one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 730 may comprise one or more tangible (e.g., non-transitory) computer readable storage media (e.g., a memory device) encoded with software comprising computer executable instructions, and when the software is executed by the processor 720, the processor 720 is operable to perform the operations described herein in connection with policy implementation and removal logic 740. In other approaches, policy implementation and removal logic 740 are stored in one or more databases accessible by processor 720.

The functions of the processor 720 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

Figure 8:
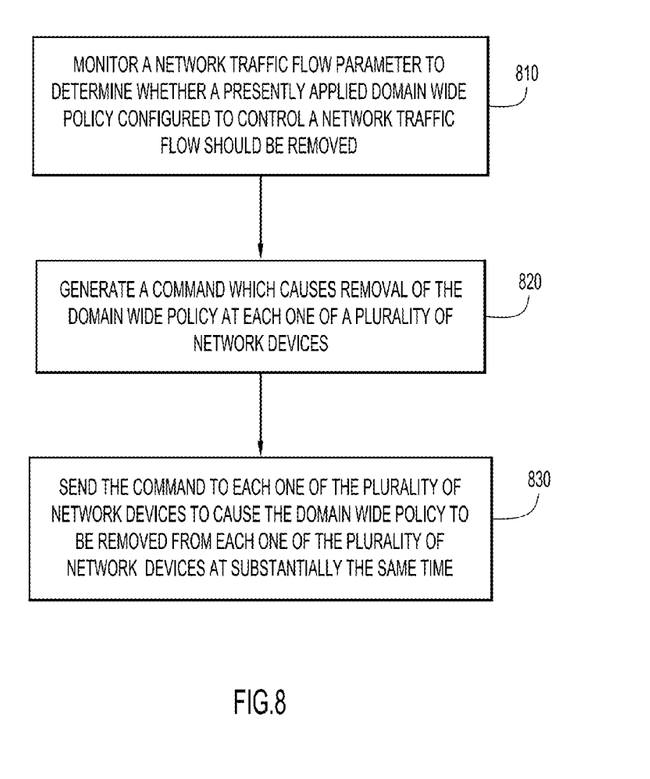
FIG. 8 is a flow chart depicting operations performed at a controller with regard to management, removal and implementation of domain wide network policies, according to an example embodiment.

FIG. 8 shows a flow chart describing operations at a controller according to the techniques described herein. At operation 810, a network traffic flow parameter is monitored to determine whether a presently applied domain wide policy configured to control a network traffic flow should be removed. At operation 820, a command is generated which causes removal of the domain wide policy at each one of a plurality of network devices. At operation 830, the command is sent to each one of the plurality of network devices to cause the domain wide policy to be removed from each one of the plurality of network devices at substantially the same time.

Figure 9:
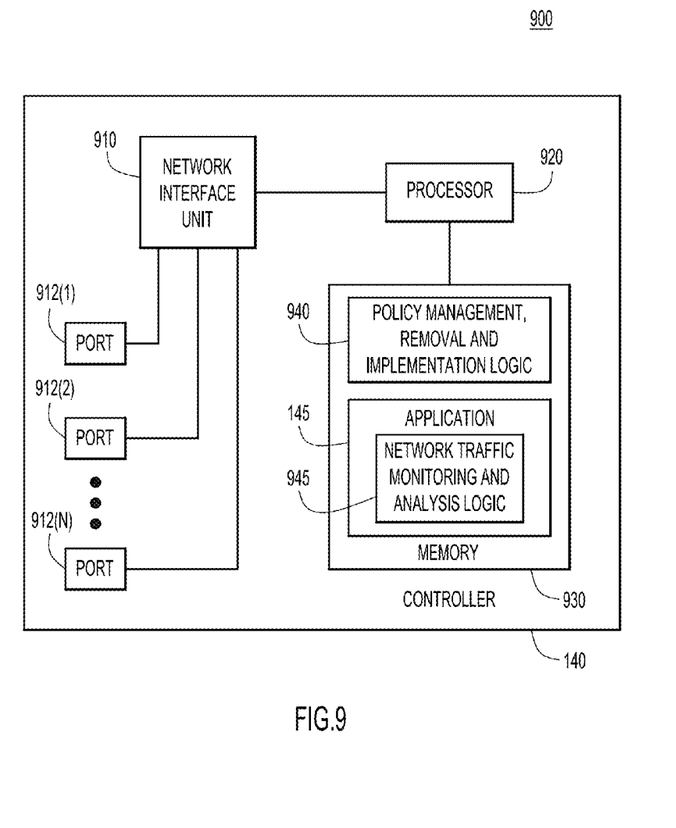
FIG. 9 is a block diagram depicting a controller having policy management, removal, and implementation logic as well as network traffic monitoring and analysis logic, according to an example embodiment.

FIG. 9 illustrates an example block diagram of an apparatus 900 (e.g., an administrative device or controller 140) configured to perform the techniques presented herein. The apparatus 900, e.g., a physical device/controller 140, comprises a network interface unit 910, ports 912(1)-912(N), a processor 920, and memory 930. The network interface unit 910 is configured to enable network communications by interfacing with a network via ports 912(1)-912(N). While conceptually illustrated as a "network interface unit," it will be appreciated that a physical device may contain more than one network interface or type of interface to communicate with other devices within a network. The processor 920 is one or more microprocessors or microcontrollers and executes policy management, removal and implementation logic 940 associated with the techniques disclosed herein. In some embodiments, controller 140 also comprises application 145, which comprises network traffic monitoring and analysis logic 945. Memory 930 stores policy management, removal and implementation logic 940, and as applicable, network traffic monitoring and analysis logic 945 (configured to effectuate the operations depicted in, e.g., FIGS. 1-5).

Memory 930 may be embodied by one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 930 may comprise one or more tangible (e.g., non-transitory) computer readable storage media (e.g., a memory device) encoded with software comprising computer executable instructions, and when the software is executed by the processor 920, the processor 920 is operable to perform the operations described herein in connection with the policy management, removal and implementation logic 940, and network traffic monitoring and analysis logic 945, as applicable. In other approaches, network traffic monitoring and analysis logic 945 may be stored in a separate device, accessible by processor 920.

The functions of the processor 920 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

In sum, embodiments described herein encompass automatic removal of transient policies across an entire administrative domain at substantially the same time. In some embodiments, policies may be automatically revoked without input from an application control plane, and without maintaining an external application state.

In addition to the advantages presented herein, e.g., simplification of router management and removal of obsolete policies, the techniques disclosed herein have numerous other advantages. Such other advantages include improved reaction speed to attacks. Since the network continuously monitors traffic flows and associated characteristics, threats may be detected as they occur. Further, the techniques presented herein allow for improved efficiency, as policies may be refined to scrub only a portion of traffic associated with an attack/threat; once the attack is over, traffic may no longer be directed through a scrubber.

Still further advantages include decoupling policies from VM migrations. For instance, policies may be installed on all WAN edge switches rather than a single edge switch facing a VM host/physical server. This accomplishes several functions. First, the policy can be applied in one place, and if an end application VM moves around within the data center, there is no corresponding need to move the policies in the network to match the VM modes. In addition, by placing the policies deeper into the network, as disclosed herein, cross customer dependencies from shared links are preemptively addressed (e.g., scrubbing traffic prior to costly/congested intra-Domain Controller links means less spill-over impacts between customers, due to exhaustion of facilities prior to VM access links.) Further, the techniques disclosed herein allow for policies to be easily extended to trusted peers, as policies can be distributed to peer SDN controllers in other LANs.

Removing obsolete policies enable IP4/IP6 troubleshooting to occur with greater ease. As an example, suppose that a DDoS attacker engages in a "SYN flood" attack, in which a series of new Transmission Control Protocol (TCP) sessions are initiated between a client and a host, but due to insufficient information to complete connection requests, the host becomes overwhelmed and can no longer process legitimate requests. Such an attack may be carried out by a botnet, which usually comprises a series of computers whose security defenses have been breached, leaving the computers under the control of a third party to carry out attacks. Once the security breach has been identified, each computer, formerly within a botnet, may eventually be cleaned and reinstated into a legitimate network. In consideration of Carrier Grade Network Address Translation, which oversubscribes limited global IPv4 addresses, permanent bans may not be practical, as groups of legitimate users may be unable to access a site. By removing obsolete domain wide policies, according to the techniques presented herein, such conflicts may be avoided.

Other advantages include easier management of consumed bandwidth. For example, Resource Reservation Protocol (RSVP) may be utilized to negotiate how much bandwidth an application might use in the control plane. Management of consumed bandwidth (e.g., ensuring that an application does not exceed a specified bandwidth) and meeting designated Quality of Service (QoS) performance metrics becomes complicated for mobile network applications and migrating data centers. Applying a policy limiting network bandwidth across an entire network domain ensures that such policies are enforced throughout the entire domain. Additionally, such policies usually do not need to be in effect for long periods of time, as network usage may vary. Accordingly, having a temporary domain wide policy, as disclosed herein, may be desirable, especially in cases in which failure to remove the policy may lead to difficulties in troubleshooting network performance (e.g., network latency due to unexpired policies, etc.) in the future.

In summary, according to one aspect, a method is provided comprising: at an administrative device in a network domain comprising a plurality of network devices, monitoring a network traffic flow parameter to determine whether a presently applied domain wide policy configured to control a network traffic flow should be removed; in response to determining that the domain wide policy should be removed, generating a command which causes removal of the domain wide policy at each one of the plurality of network devices; and sending the command to each one of the plurality of network devices to cause the domain wide policy to be removed from each one of the plurality of network devices at substantially the same time.

Similarly, an apparatus is provided comprising a network interface unit configured to send and receive communications over a network; memory configured to store one or more network policies, indicators, or parameters associated with monitoring network traffic flow; and one or more processors coupled to the network interface unit, and configured to: monitor a network traffic flow parameter to determine whether a presently applied domain wide policy configured to control a network traffic flow should be removed; generate a command which causes removal of the domain wide policy at each one of the plurality of network devices, in response to determining that the domain wide policy should be removed; and cause the command to be sent via the network interface unit to each one of the plurality of network devices to cause the domain wide policy to be removed from each one of the plurality of network devices at substantially the same time.

According to another aspect, a method is provided comprising: at a plurality of network devices in a network domain, receiving a domain wide policy configured to control a flow of network traffic through each of the plurality of network devices; implementing the domain wide policy; and removing the domain wide policy, in accordance with one or more parameters specifying that the domain wide policy is to be removed, such that the domain wide policy is removed from each one of the network devices in the plurality of network devices at substantially the same time.

Still further, a system is provided comprising: a plurality of network devices in a network domain, wherein each network device comprises: a network interface unit configured to send and receive communications over a network; memory configured to store one or more network policies or parameters associated with network traffic flow; and one or more processors coupled to the network interface unit, and configured to: receive a domain wide policy configured to control a flow of network traffic through each of the plurality of network devices at a plurality of network devices in a network domain; implement the domain wide policy; and remove the domain wide policy, in accordance with one or more parameters specifying that the domain wide policy is to be removed, such that the domain wide policy is removed from each one of the network devices in the plurality of network devices at substantially the same time.

The above description is intended by way of example only. Various modifications and structural changes may be made therein without departing from the scope of the concepts described herein and within the scope and range of equivalents of the claims.

What is claimed is:
1. A method comprising:
at a plurality of network switching and routing devices in a network domain, receiving a domain wide policy configured to control a flow of network traffic through each of the plurality of network switching and routing devices;
implementing the domain wide policy; and
removing the domain wide policy, in accordance with one or more parameters specifying that the domain wide policy is to be removed, such that the domain wide policy is removed in a synchronized manner, based on a domain clock, from each one of the network switching and routing devices in the plurality of network switching and routing devices in the network domain,
wherein the domain wide policy is removed by placing the domain wide policy in an idle state on each one of the plurality of network switching and routing devices in the network domain and wherein the domain wide policy is reengaged upon request, wherein the one or more parameters comprises an indicator stored at a location to which a pointer stored on specific ones of the network switching and routing devices point, such that when an indication in the location indicates removal of the domain wide policy on the administrative device, removal of the domain wide policy at each device of the plurality of network switching and routing devices is automatically triggered.

2. The method of claim 1, wherein at least one of the one or more parameters is a timing parameter specifying an end timestamp indicating how long the domain wide policy is to remain in effect, and removing the domain wide policy upon determining that a time specified by the end timestamp has been exceeded.

3. The method of claim 1, further comprising monitoring the indicator at an interval specified by a timer, a timestamp, or according to instructions received from an administrative device.

4. The method of claim 1, wherein deleting comprises deleting the domain wide policy in accordance with another parameter, wherein the another parameter comprises a command received from a network administrative device that instructs deletion of the domain wide policy.

5. The method of claim 1, wherein deleting the domain wide policy is performed independently from an administrative device.

6. A system comprising:
a plurality of network switching and routing devices in a network domain, wherein each network device comprises:
a network interface unit configured to send and receive communications over a network;
memory configured to store one or more network policies or parameters associated with network traffic flow; and
one or more processors coupled to the network interface unit, and configured to:
receive a domain wide policy configured to control a flow of network traffic through each of the plurality of network switching and routing devices at a plurality of network switching and routing devices in a network domain;

implement the domain wide policy; and remove the domain wide policy, in accordance with one or more parameters specifying that the domain wide policy is to be removed, such that the domain wide policy is removed in a synchronized manner, based on a domain clock, from each one of the network switching and routing devices in the plurality of network switching and routing devices in the network domain, wherein the domain wide policy is removed by placing the domain wide policy in an idle state on each one of the plurality of network switching and routing devices in the network domain and wherein the domain wide policy is reengaged upon request, and wherein the one or more parameters comprises an indicator stored at a location to which a pointer stored on the plurality of network switching and routing devices point, and wherein the processor is configured to remove the domain wide policy at each device of the plurality of network switching and routing devices automatically, when an indication in the location indicates removal of the domain wide policy on the administrative device.

7. The system of claim 6, wherein at least one of the one or more parameters is a timing parameter specifying an end timestamp indicating how long the domain wide policy is to remain in effect, and wherein the processor is configured to remove the domain wide policy upon determining that time specified by the end timestamp has been exceeded.

8. The system of claim 6, wherein the processor is configured to monitor the indicator at an interval specified by a timer, a timestamp, or according to instructions received from an administrative device.

9. The system of claim 6, wherein the processor is configured to delete the domain wide policy in accordance with another parameter, wherein the another parameter comprises a command received from a network administrative device that instructs deletion of the domain wide policy.

10. The system of claim 6, wherein the processor is configured to delete the domain wide policy independently from an administrative device.

* * * * *